Oct. 13, 1942.  R. COVER  2,298,550
CORN HUSKING MACHINE
Original Filed Jan. 22, 1938   8 Sheets-Sheet 1
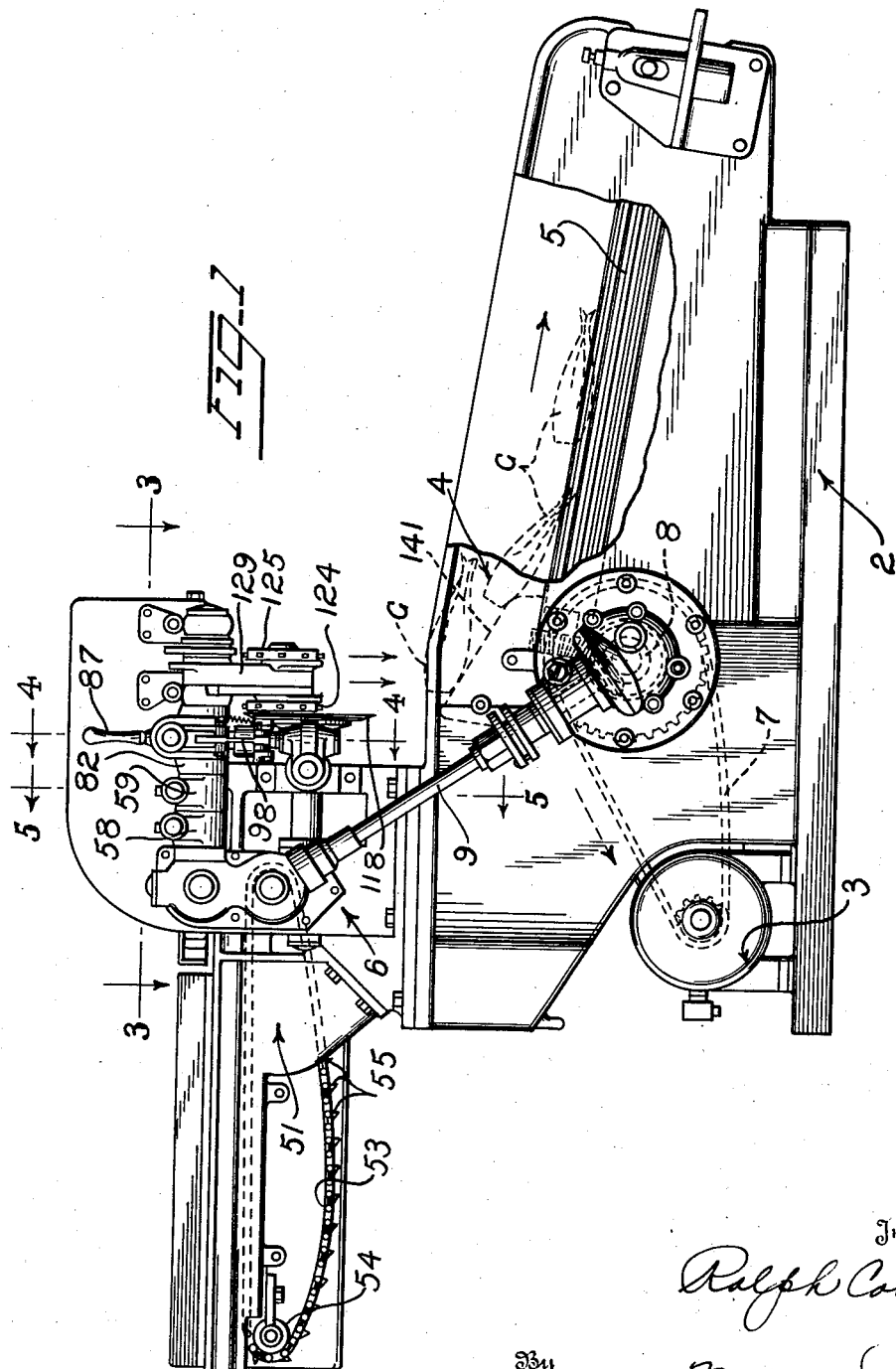
Inventor
Ralph Cover
By
Mason & Porter
Attorneys

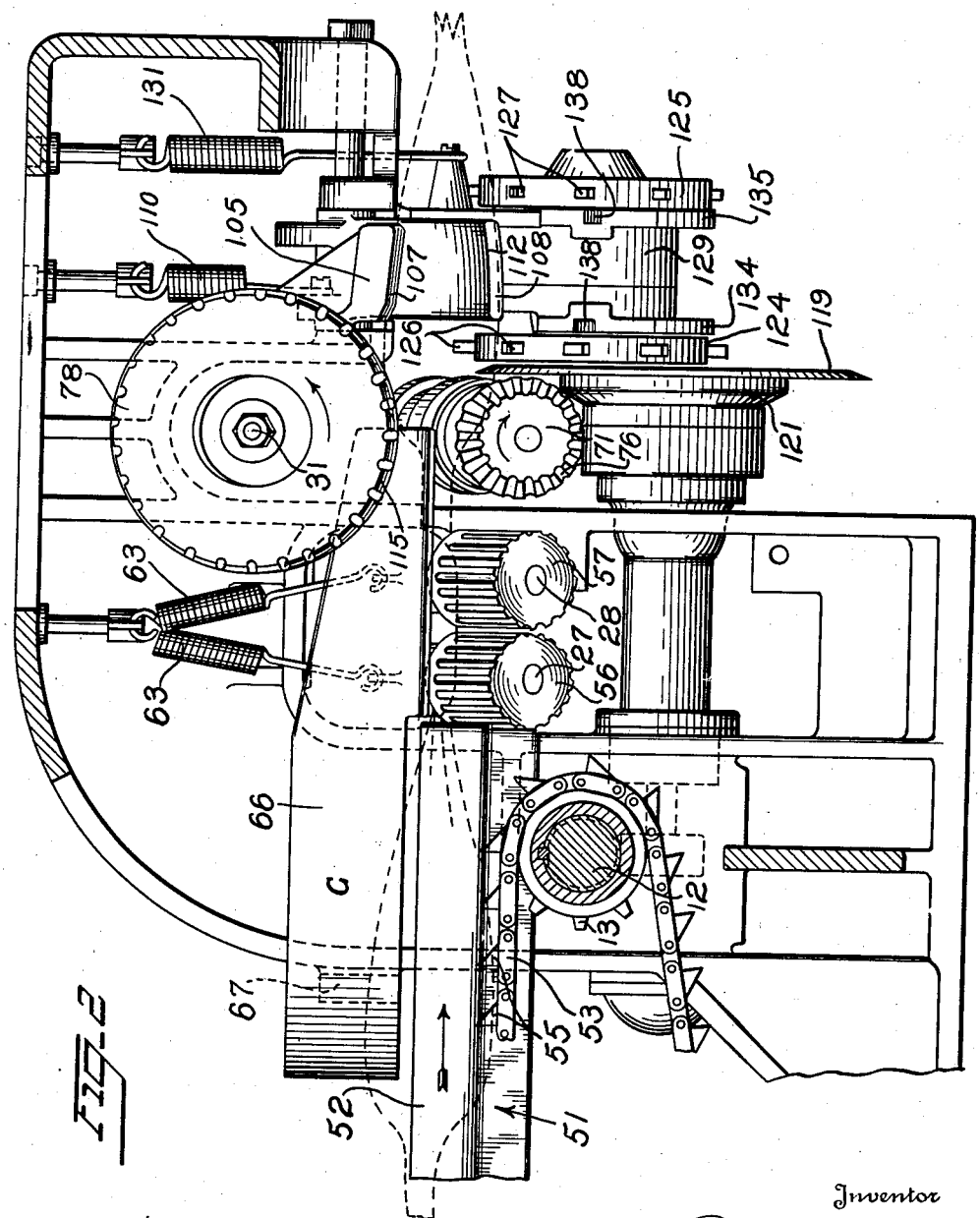

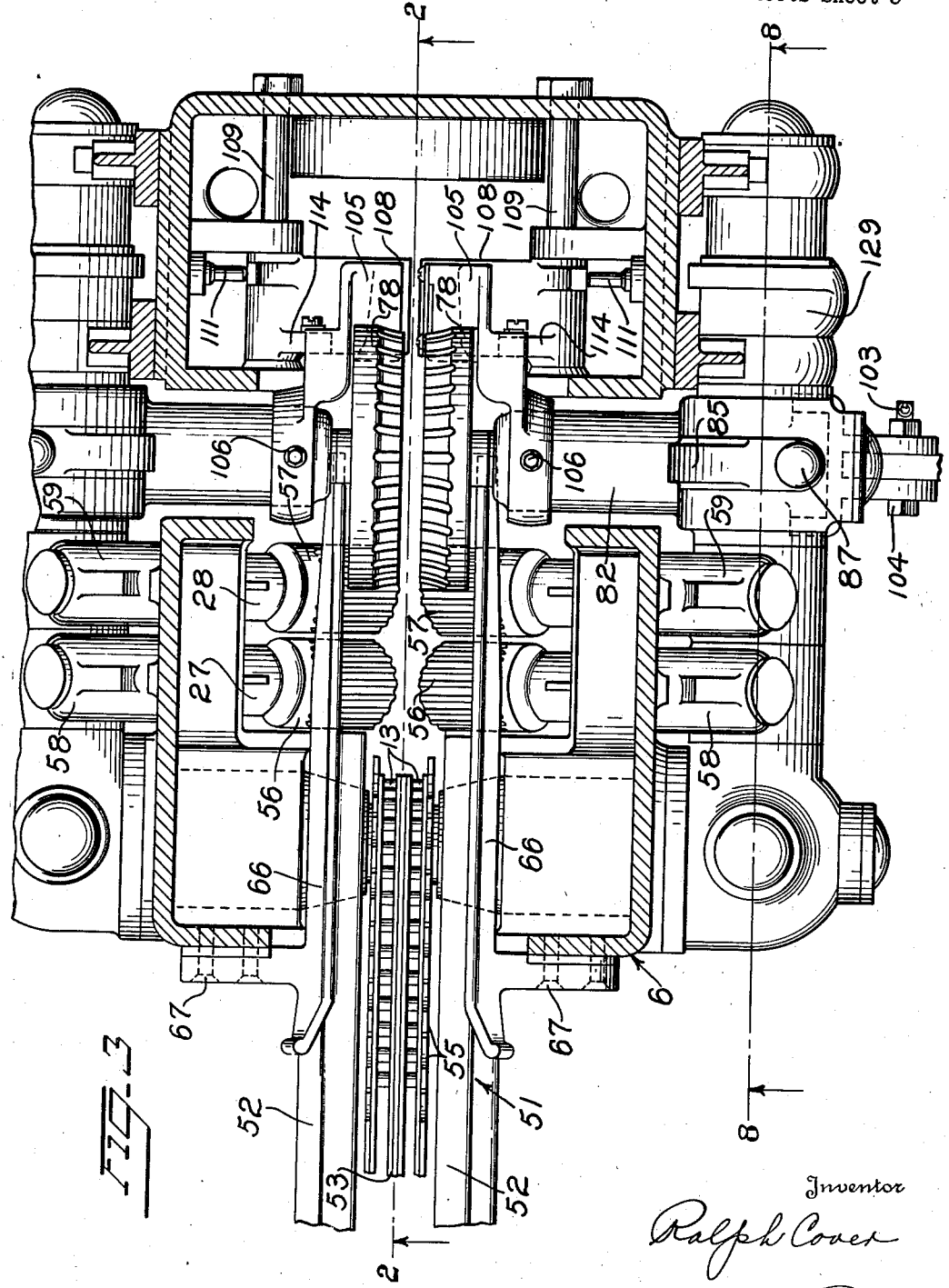

Oct. 13, 1942.　　　　　R. COVER　　　　　2,298,550
CORN HUSKING MACHINE
Original Filed Jan. 22, 1938　　8 Sheets-Sheet 4
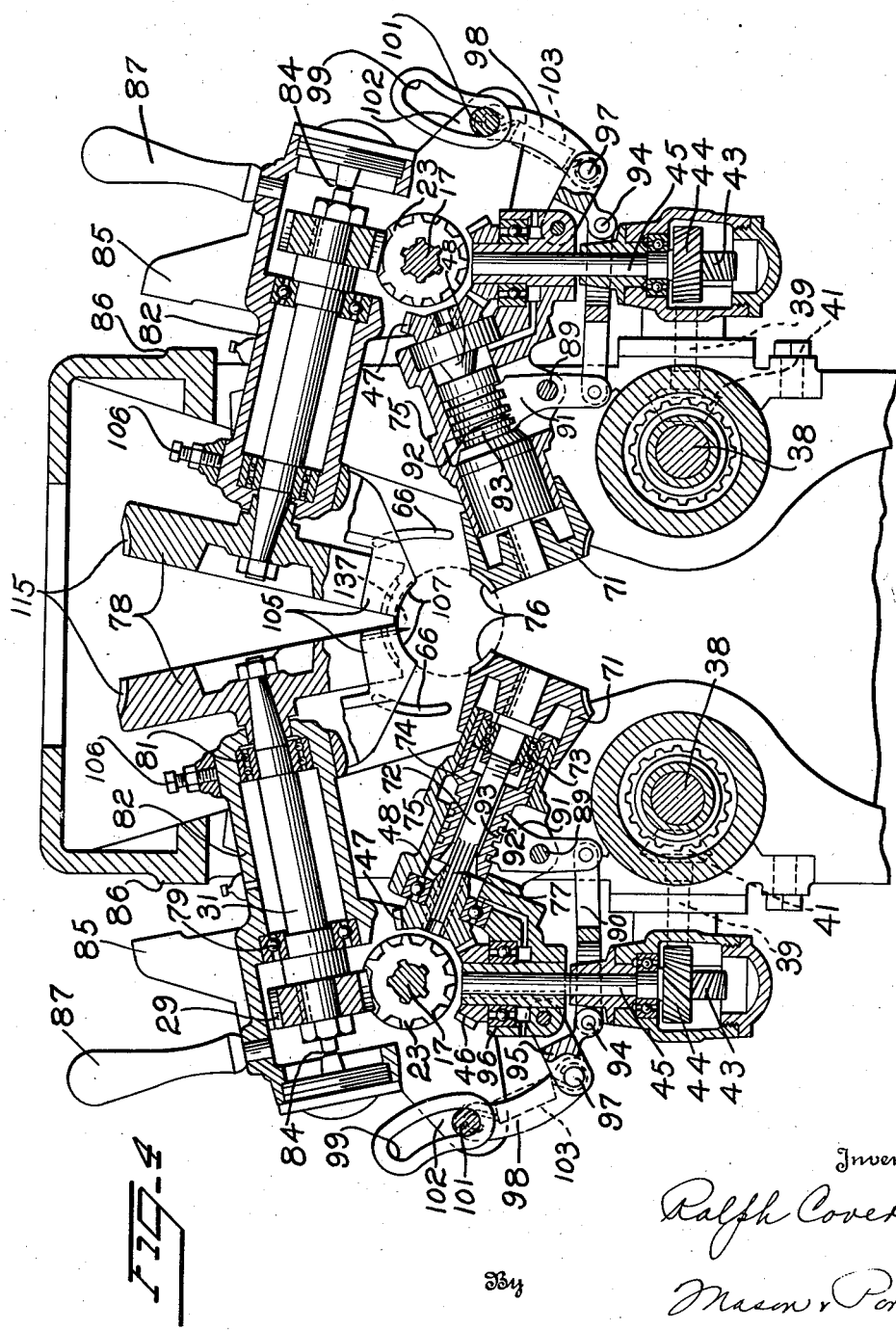
Inventor
Ralph Cover
By
Mason & Porter
Attorneys

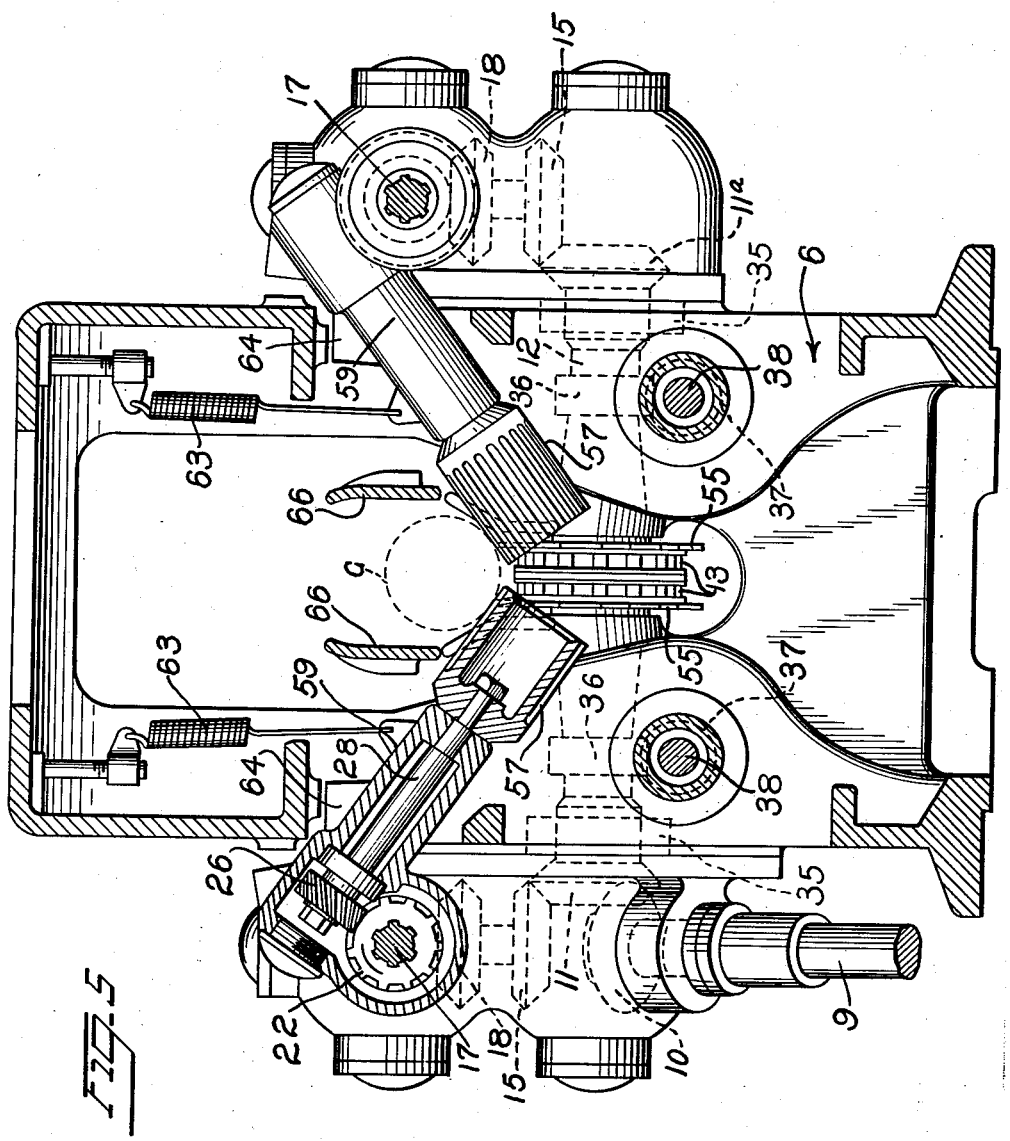

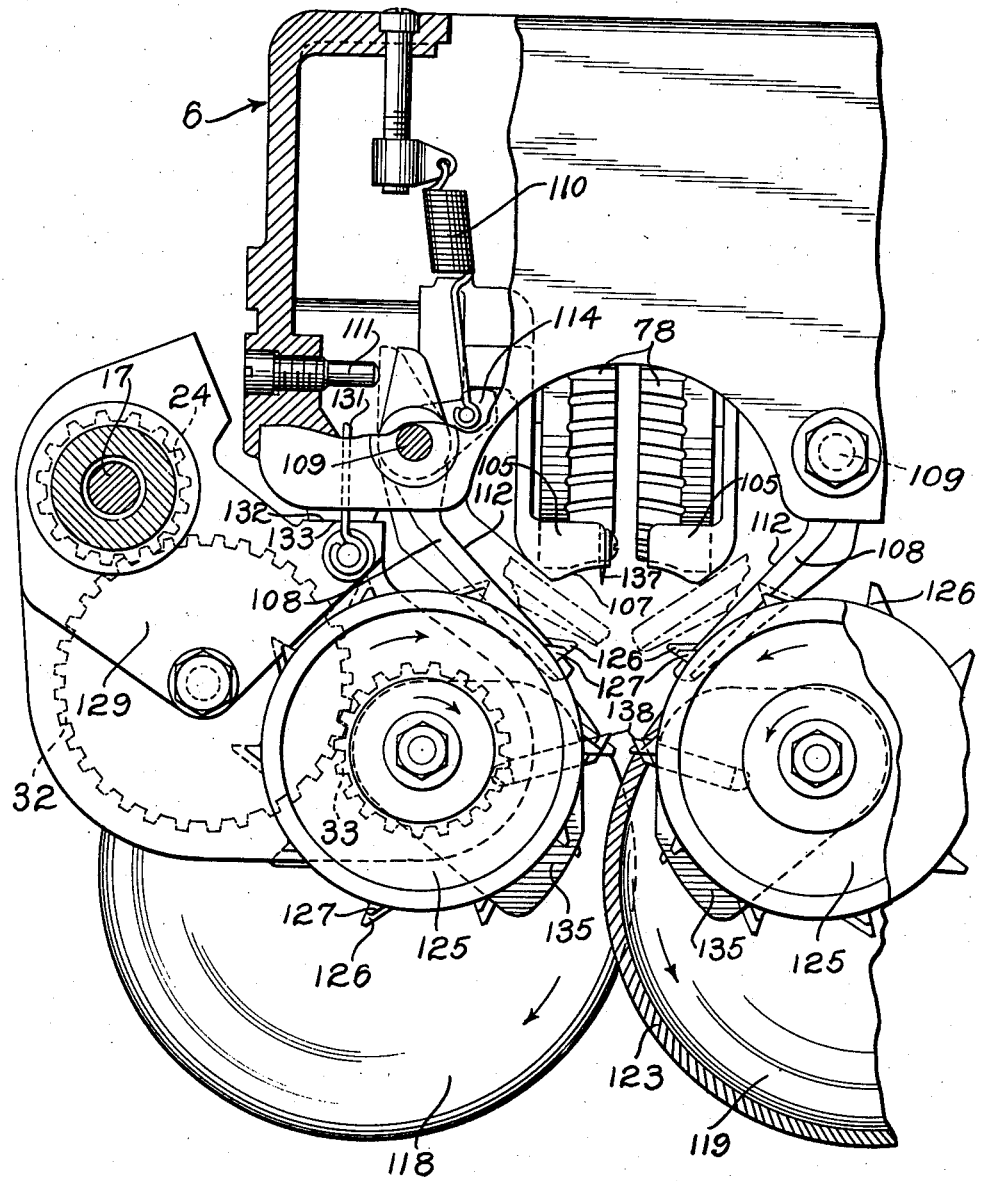

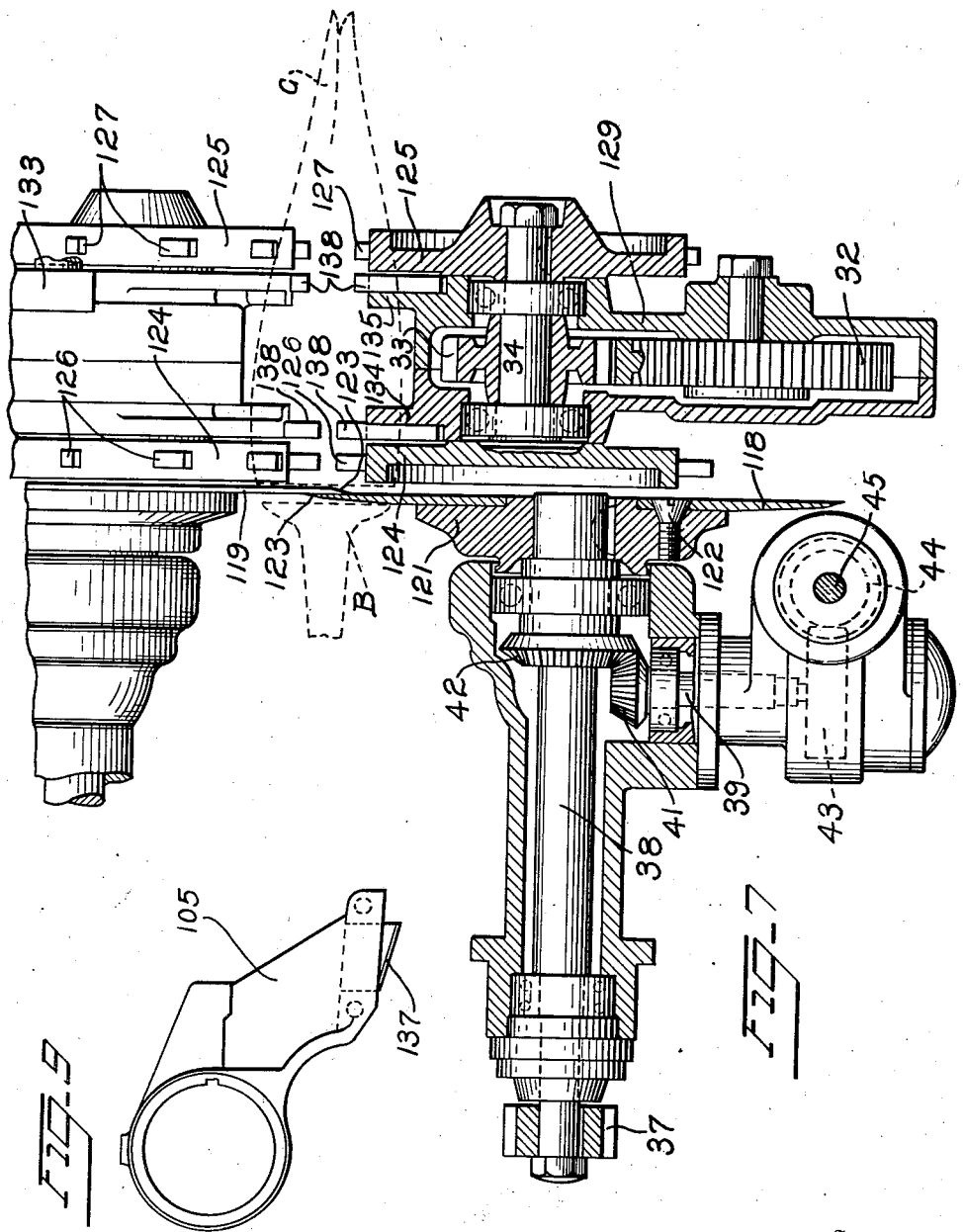

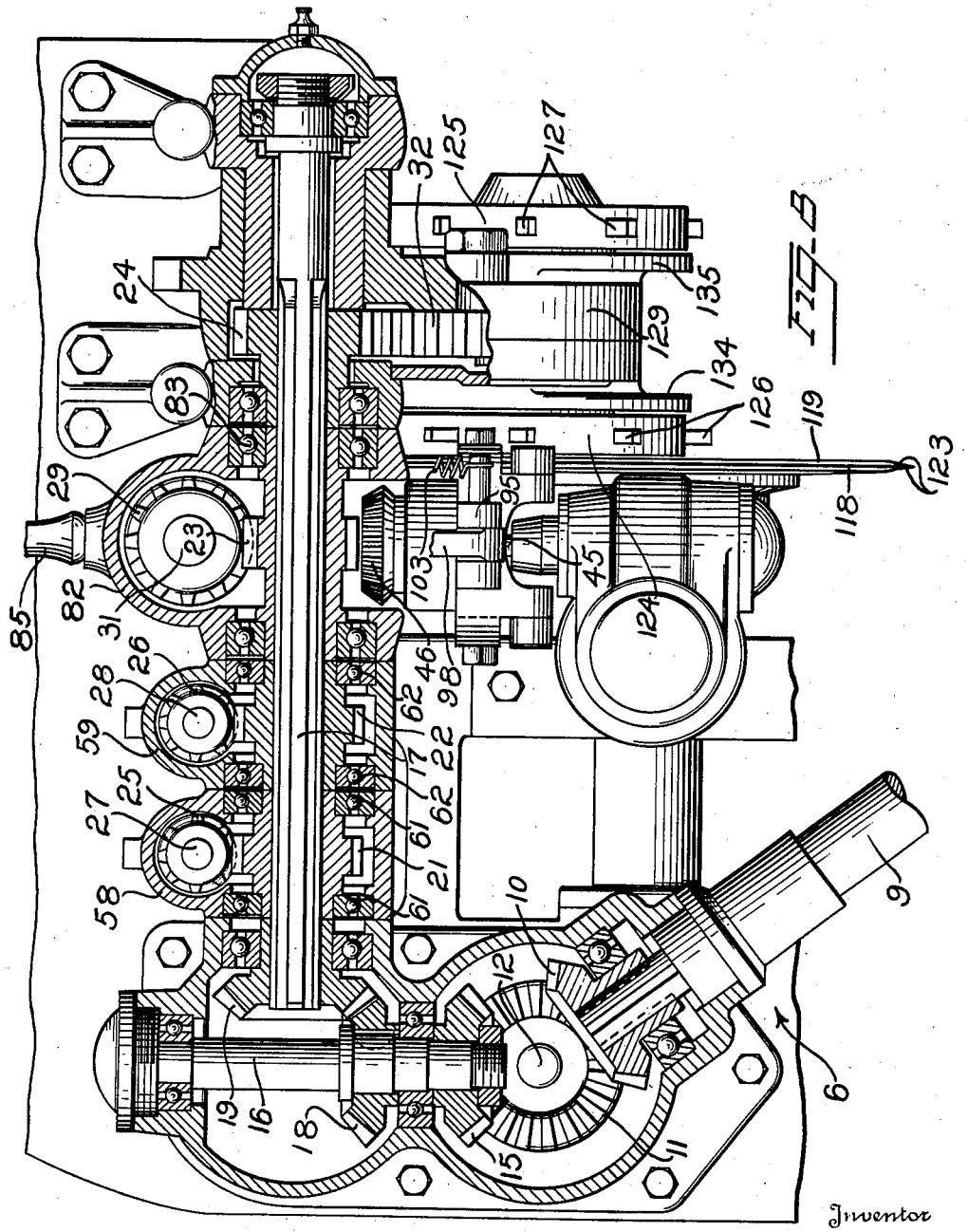

Patented Oct. 13, 1942

2,298,550

UNITED STATES PATENT OFFICE 2,298,550

CORN HUSKING MACHINE

Ralph Cover, Westminster, Md.

Original application January 22, 1938, Serial No. 186,419, now Patent No. 2,242,113, dated May 13, 1941. Divided and this application December 18, 1940, Serial No. 370,704

18 Claims. (Cl. 130—5)

The invention relates generally to apparatus for preparing green corn for canning or other similar treatment and primarily seeks to provide a novel machine structure for efficiently husking the corn as it is received from the grower and prior to intended cutting or stripping thereof.

In order to properly prepare green corn, as received from the grower, prior to cutting or stripping thereof for canning or other similar treatment, it is necessary first that the husks and all portions of the ears upon which the grains are not directly disposed be removed without injury or abuse to the relatively delicate grains. It has been found that the husks can be mechanically removed from the ears by longitudinally slitting the husks, debutting the ears at the annular shoulders of the first grain circle, ruffling the husks so as to minimize the clinging of the husks to one another and to the grain rows, and thereafter subjecting the ears to the action of husking tumblers or rolls for complete removal of the husks. It is the purpose of the present invention to provide a novel machine in which is embodied mechanisms novel in construction and arrangement and which cooperate in performing with great facility the various combined functions referred to. The present application is a division of my co-pending parent application filed January 22, 1938, Serial Number 186,419 and which particularly stresses the corn ear debutting means and the associated mechanisms for feeding the corn ears to and from said debutting means.

Another object of the invention is to provide a machine of the character stated in which is embodied novel means for presenting the corn ears to the debutting knives, and husk slitting means for slitting the husks while said ears are moving toward said debutting knives, said slitting means being mounted in a novel manner for following the contours of corn ears engaged thereby so as to efficiently perform their slitting function without cutting away or injuring the tender grains of corn.

Another object of the invention is to provide a machine of the character stated in which is embodied novel means for ruffling the slit husks as the corn ears are passed through the debutting knives.

Another object of the invention is to provide a machine of the character stated in which the corn ear feeding or presenting means, the slitting means, the ruffling means, the debutting means, and the husking rolls are cooperatively arranged in a novel manner assuring thorough and rapid removal of all husks without damage to the tender grains of corn.

Another object of the invention is to provide a novel machine of the character stated in which there is included feed-in chain equipment for carrying the corn ears from a receiving trough into engagement with driven feed-in rollers which act to transfer the corn ears by endwise movement, small ends foremost, to aligning devices including aligning rolls and opposing presser wheels effective to position the ears with their butts properly aligned with rotating debutting knives, means for mounting the rolls and wheels for independent movement to enable them to properly engage and compensate for the varying contours of corn ears of different sizes and including presser plates engageable with the corn ears to cause said wheels to follow the contour of said ears, carrier wheel assemblies for engaging corn ears aligned by said aligning devices and carrying them past the debutting knives and for directing the debutted ears to the husking rolls, slitting knife equipment presser plates supported in position for slitting the husks lengthwise of the ears while traveling to the aligning position, and relatively stationary ruffling fingers associated with the carrier wheel assemblies and so positioned that the husks previously slit while moving into butt aligning position are torn thereby from their clinging engagement with the grain rows as the ears are moved through the debutting knives.

Another object of the invention is to provide a novel method of husking corn which comprises longitudinally slitting the husks on the corn ears, then debutting said ears, then gripping and tearing the longitudinally slit husks from the debutted ears.

Another object of the invention is to provide a novel method of the character stated including the step of ruffling the longitudinally slit husks prior to the tearing thereof from the corn ears.

With the above and other objects in view which will more fully appear, the nature of the invention will be more clearly understood by following the description, the appended claims, and the several views illustrated in the accompanying drawings.

In the drawings:

Figure 1 is a side elevation of a machine embodying the features of the invention, parts being broken away.

Figure 2 is a vertical central longitudinal section taken on the line 2—2 on Figure 3.

Figure 3 is a horizontal sectional view taken on the line 3—3 on Figure 1.

Figure 4 is an enlarged fragmentary vertical cross sectional view taken on the line 4—4 on Figure 1.

Figure 5 is an enlarged fragmentary vertical cross sectional view taken on the line 5—5 on Figure 1.

Figure 6 is an enlarged fragmentary end elevation looking in the direction of the debutting knives, a portion of the head housing being broken away, and aligning rolls, feed-in rollers and chain being omitted.

Figure 7 is a horizontal sectional view through one of the debutting knife assemblies and cooperating carrier mechanisms.

Figure 8 is a vertical longitudinal sectional view taken on the line 8—8 on Figure 3.

Figure 9 is a detail view illustrating the slitting knife and its mounting.

In the machine herein illustrated as an example of embodiment of the invention there is included a bed 2 upon which may be mounted an electric motor 3. A frame 4 located upon the bed 2 serves as a mounting for the husking tumblers 5 and as a support for the head frame 6 upon which the major portion of the mechanisms of the present invention are carried.

*Driving assembly*

A chain drive 7 may be employed to drive the cross shaft for the tumblers 5 upon which there is mounted a bevel gear 8 engageable with a complementary gear carried upon the head drive shaft 9.

Referring now to Figs. 5 and 8 the drive shaft 9 has, at its upper end, a bevel gear 10 meshing with a similar gear 11 carried by the horizontal drive shaft 12 for the feed-in chain drive sprockets 13. A gear 11a identical to the gear 11 is mounted upon the opposite end of the drive shaft 12 and each of the gears 11 and 11a are arranged in mesh with gears 15 carried upon vertical intermediate shafts 16 one located upon each side of the head frame 6 and serving respectively to drive the two horizontal parallel and spaced apart primary drive shafts 17 through cooperating bevel gears 18 and 19.

Carried upon the primary shafts 17 there are helical cut gears 21, 22 and 23 and spur gears 24. Of these gears, 21 and 22 are in mesh respectively with similarly cut pinions 25 and 26 upon the feed-in roll drive shafts 27 and 28, the gears 23 are in mesh with gears 29 on the presser wheel drive shafts 31 and the gears 24 are in mesh with the intermediate gears 32 (see Figs. 7 and 8) which gears 32 are in turn in mesh with gears 33 carried by the carrier wheel drive shafts 34.

Referring now to Figs. 4, 5 and 7, the drive shaft 12 carries, between the feed-in chain sprockets 13 and shaft bearings 35, a pair of helical cut gears 36 which mesh with similarly cut gears 37 carried upon horizontal, parallel and spaced apart shafts 38. The shafts 38 comprise the debutting knife drive shafts and are located relative to the operating parts on the head frame 6, as best indicated in Fig. 5.

Mounted perpendicularly with respect to the shafts 38, and in a horizontal plane, are intermediate shafts 39 having bevel gears 41 at their inner ends in mesh with bevel gears 42 carried upon the adjacent portions of the shafts 38. The intermediate shafts 39 are further provided with helical cut gears 43 at their outwardly directed ends, which mesh, respectively, with similar gears 44 carried by second intermediate and vertically disposed shafts 45. At the upper ends of the shafts 45 are bevel gears 46 which mesh with similar gears 47 carried by the aligner drive stub shafts 48, the latter shafts being mounted upon axes which extend angularly downwardly toward one another in a common vertical plane including the axes of the presser wheel drive shafts 31.

From the foregoing it will be noted that all power operated parts of the machine may be driven from a single power unit and all are possessed of positive drive connections at fixed relative speed ratio although, as will hereinafter appear, each sub-assembly may perform its full and required operation, as to time and amplitude, without regard to similar work phases of the remaining and cooperating sub-assemblies.

*Feed-in assembly*

Referring to Figs. 1, 2, 3 and 5, the feed-in mechanism may comprise a frame 51 mounted upon the head frame 6 and extended generally in a horizontal direction. The frame 51 is formed with spaced apart inner wall surfaces 52 which diverge upwardly, as the walls of a hopper, to provide a receiving table upon which the ears of corn may be dropped for disposition upon the endless feed-in chain 53, which chain is positioned horizontally along the space immediately between the lower edges of the surfaces 52. A pair of idler sprockets 54, rotatably mounted upon the frame 51, carry one end of the chain loop, and the other end thereof being disposed over the driven sprockets 13 upon the cross shaft 12.

The chain 53, as best shown in Figs. 2 and 5, is formed with its outermost links provided with teeth 55 upon which the ears of corn may rest and which prevent relative slippage between chain and ears as the ears are drawn thereupon toward the feed-in rollers 56 and 57.

The feed-in rollers 56 and 57 are arranged in pairs, the rollers 56 being carried on the shafts 27 and the rollers 57 on the shafts 28. The shafts 27 and 28 are rotatably mounted within hollow arms 58 and 59 respectively, each of which is in turn pivotally mounted upon the adjacent shafts 17, through the medium of anti-friction bearings 61 and 62 respectively, as indicated in Fig. 8. Tension springs 63, see Figs. 2 and 5, serve yieldingly to draw the arms 58 and 59 with their corresponding feed-in rollers 56 and 57 upwardly until resisted by stops 64, with the trough formed by the pairs of rollers in operative registry with the corn as it travels endwise upon the chain 53.

This yielding mounting for the driven feed-in rollers permits the rollers to be drawn downwardly to pass the stalk of the ear therethrough, as when the ears are caused to move in a downward direction, during operation of the aligning mechanism. In addition such mounting of the rollers 56 and 57 may assure continuous passage of ears of all sizes from the chain to the aligning rolls while maintaining the under side of each ear in a certain, predetermined and fixed horizontal position and during this feeding movement of the corn ears the springs 63 will yield lightly for ears of larger diameter and the stops 64 serve to set the rollers for exact registry with ears of minimum diameters.

As shown in Figs. 3 and 5, guide rails 66 secured to the head frame 6, as shown at 67, may be employed to preclude lateral displacement of the ears during their travel along the inner end of the chain 53, over the rollers 56 and 57 and into engagement with the aligning mechanism.

*Aligning assembly*

The aligning assembly constitutes a very important assembly of the present machine.

This assembly, as shown in Figs. 2, 3 and 4, comprises aligning rolls 71, fixed upon shafts 72 which in turn are rotatably mounted upon anti-friction bearings 73 carried by sleeves 74 slidably located in the fixed housings 75 upon which the aligner roll drive stub shafts 48 are mounted. As previously described, the axes of the two aligner roll shafts extend angularly downwardly toward one another in a common vertical plane including the axes of the pressure wheel drive shafts 31, and the sleeves 74 may thus move along such angularly extending axes to cause the aligning rolls to move toward and away from one another, and at the same time to vary the position of the work engaging and concave surfaces 76 of the rolls correspondingly toward and away from the central vertical plane of the aligning assembly, as well as downwardly and upwardly. It is this feature of the aligner roll mounting that permits the corn to move with its under side in a certain and predetermined fixed path from the feed-in chain and horizontally over the aligning rolls even though successively treated ears may differ widely as to their diameter.

Driving engagement between the stub shafts 48 and roll shafts 72 is maintained by splining the telescoping parts, as indicated at 77, so that free longitudinal movement of the shafts 72 may take place as the sleeves 74 are shifted.

Before describing further the structural and operating characteristics of the aligner rolls it is necessary to note the relationship of the presser wheels with respect thereto. These wheels 78 of which there are two in number, are independently mounted and driven as are the two aligner rolls 71 each being fixed upon one of the drive shafts 31 (see Fig. 4). The shafts 31 may be supported on anti-friction bearings 79 and 81 carried within housings 82 pivotally mounted, through the medium of anti-friction bearings 83, upon the adjacent shafts 17 (see Fig. 8). End thrust bearings 84 may serve to prevent axial movement of the wheel shafts 31 which might otherwise occur during operation. The presser wheels 78 may thus be swung through an arc in a vertical plane common to the axes of the aligner rolls 71 as they are caused to do during passage of an ear of corn thereunder in a degree determinable by the diameter of the ear.

Means for limiting downward swinging movement of the presser wheels 78 to a position just sufficient to insure of their engagement by ears of minimum diameter may comprise stop lugs 85 formed on the housings 82 which may engage surfaces 86 formed on the head frame 6. Hand grips 87 may be provided on the housings 82 for manual manipulation of the presser wheel and aligner roll assemblies.

Referring to Figs. 3 and 4, the aligner shaft housings 75 each have pivotally mounted thereon, at 89, plates 91, formed with teeth 92 in arcuate array and engageable with teeth 93 circumscribing the outer walls of the sleeves 74 in such manner that pivotal movement of the plates 91 results in right line movement of the sleeves 74 with their associated aligner rolls 71. Pivotally connected to the plate 91, on the remote side of their pivotal axes 89, are rigid links 90, which in turn are pivotally connected at 94 to bell-crank elements 95 pivoted upon the portions 96 of the housings 75, on the outer sides of the vertical shafts 45. The elements 95 have, pivotally connected thereto at 97, arms 98 provided with arcuate slotted portions 99 at their outer ends within which cylindrical stops 101 are disposed and eccentrically mounted upon the portions 102 of the housings 82. Tension springs 103 interconnect the bell-cranks 95, on the center 97, and the portions 102 of the housings 82 on the axes of the mountings for the stops 101, thus to maintain the stops 101 yieldingly engaged with the innermost ends of the slotted portion 99 of arms 98. This arrangement operates through the linkage described, to cause the aligner rolls 71 to move away from the central working axis of the machine as the associated presser wheels 78 are raised and to move toward said axis as the wheels 78 are lowered, although, because of the slotted arms 98 and springs 103, the wheels 78 may move downwardly without accompanying relatively inward movement of the aligner rolls 71. The normal relationship between presser wheel movement and aligner roll movement may be adjusted by the simple expedient of turning the cylindrical stops 101 on their eccentric mountings, as by turning the heads 104 thereof.

Each of the presser wheels 78 has associated therewith a fixed presser plate 105 fixed, as shown at 106 in Figs. 3 and 4, to the adjacent housing 82 and each presenting a work engaging surface 107, see Figs. 2 and 4, extending away from the lower portion of the adjacent presser wheel in the direction of travel of the corn and fashioned to conform substantially to the contour of an ear of corn as it rests in position for delivery to the carrier wheels.

Located beneath the surfaces 107 of the presser plates 105, and for engagement with the under sides of the ears as they pass into position prior to delivery to the carrier wheels, are a pair of retarding plates 108, see Figs. 2 and 6. The retarding plates 108 are pivotally mounted at 109 upon the frame 6 and each is drawn yieldingly upwardly upon its pivotal mounting by adjustably mounted tension springs 110, to positions determinable by adjustable stops 111. In Fig. 6 I have indicated in dot and dash lines the elevated position of the retarding plates, as when engaging the stops 111. The stops 111 are preferably set so that the under side of the corn may depress the plates slightly against the tension of the springs 110, as it is passed from between the presser wheel and aligner roll assemblies thereby to cooperate with the presser plates 105 in retarding endwise movement of the ear so that it is compelled to follow over and downwardly about the curvature of the spaced aligner rolls, for purposes hereinafter specifically described. As in the case of the surfaces 107 of the presser plates 105, the retarding plates 108 are formed with work engaging surfaces 112 which substantially conform in contour to the ear as it moves to its final aligned position prior to delivery to the carrier wheels. The plates 108 are each provided with arm portions 114 presenting bosses against which the adjacent under side portions of the presser plate 105 may bear, when the presser wheel assemblies move toward their downward limit of travel, thus to urge the retarding plates downwardly against the force of the springs 110 and to facilitate descent of the ear into engagement with the carrier wheels.

With reference to Fig. 2, the concave work engaging surfaces of the aligner rolls 71 are preferably transversely grooved, as are the similar concave surfaces 115 of the presser wheels 78, in order to assure non-slipping engagement with the ear. In like manner the feed-in rolls 56 and 57 may be formed with transverse grooves on the outer surfaces thereof to assure efficiency in the feeding of the ears to the aligning assembly.

Cutting assembly

The cutting assembly includes a pair of circular cutting knives 118 and 119 fixed upon hub members 121, as by screws 122, which in turn are mounted upon the shafts 38 to turn therewith as shown in Fig. 7 and cooperating pairs of driven carrier wheels between which the corn is engaged and carried downwardly past the cutting knives.

The cutting knives 118 and 119 are arranged with their cutting edges overlapping at a point directly beneath the central axis of the ear, at the shoulder thereof, when in its final aligned position. As indicated in Fig. 6 the outwardly directed face of each of the knives, on its ground cutting edge, is serrated as shown at 123. The direction of rotation of the knives is toward one another with respect to the descending ears.

The carrier wheels may comprise two pairs of wheels 124 and 125 respectively, the wheel 124 being mounted upon that end of each of the shafts 34 adjacent to the cutting knives and the wheels 125 being mounted upon the opposite ends of the shafts 34. The wheels 124 are formed with radially extending grip teeth 126 at the midportions of their peripheries, and the wheels 125 with similar teeth 127 but of lesser height. Both sets of teeth 126 and 127 are inclined slightly in the direction of rotation of the wheels thus to provide positive grip on the ears as they contact therewith. The spacing of the carrier wheels relative to the length of the shafts 34 and to the cutting knives is such that the ears are gripped at points spaced apart intermediate their lengths and forwardly of the butt section but sufficiently close thereto that the ears may be firmly held against displacement during the actual debutting process.

Each of the driving gear trains for the carrier wheel driven shafts 34 previously described is contained within a housing 129, said housings being in turn pivotally mounted about the centers of the primary shafts 17, and each housing 129 is drawn yieldingly upwardly by tension spring means 131 until resisted by engagement between the stop surfaces 132 and 133 of the housing and head frame 6 respectively, as shown in Fig. 6. This arrangement results in holding the pair of carrier wheels in immediate position for engagement with the ear as it moves over and about the aligner rolls 71 to its final aligned position, at which time the carrier wheels, by their tooth portions, function to grip the ear and to carry it downwardly past the cutting knives thereby to sever the butt. The provision of the pivotal mounting for the carrier wheel assemblies and the springs 131 serves to urge the opposed carrier wheels of each pair toward one another and hence toward the corn ear presented thereto so that no matter what diameter corn ear is aligned for debutting, the wheels may grip it with uniformness and carry it downwardly past the driven debutting knives.

In order to facilitate removal of the ears from engagement by the teeth upon the conveyor wheels after the butt has been severed, the housing 129 is provided with flanges 134 and 135 which extend radially beyond the teeth 126 and 127 respectively below the center lines of the conveyor wheels as best shown in Figs. 6 and 7.

Husk slitting and ruffling elements

Secured to one of the presser plates 105, and extending outwardly from its work engaging surface 107, is a slitting knife 137, as shown in Figs. 3, 4 and 6, so arranged that as a corn ear is moved endwise under the presser plate, just prior to its movement into final aligned position, the husk will be slit longitudinally for a portion of its length. Inasmuch as the knife 137 is fixed relative to the movable presser assembly, the depth of penetration of the knife edge through the husk will be uniform, regardless of ear size, and hence may be adjusted so as not to cut into the grain rows of the corn. This slitting of the husk enables the preliminary step of the husking process to become more efficient as carried out by the ruffling elements.

The ruffling elements comprise relatively stationary and sharply pointed fingers 138 fixed in the flange portions 134 and 135 of the housings 129. These fingers 138, see Fig. 6, are pointed and inclined upwardly at about the central horizontal plane of the carrier wheel assemblies and serve as a corn ear is carried downwardly between the wheels during the operation of the cutting knives to engage with and tear away or loosen the husk which previously has been subjected to slitting by the knife 137. When the ear has been delivered from the carrier wheels and permitted to fall downwardly toward the husking tumblers 5, it will have its husk partially free from the grain rows and in proper condition for complete husking under action of the tumblers 5.

It will be noted, see Fig. 1, that while the corn ears are caused to fall downwardly in the same position occupied during their travel between the carrier wheels, that there is disposed upon the bed frame 4 at the head of the tumblers 5, a guide platform 141 presenting an inclined upwardly directed surface beneath the falling ears. The inclined surface of the platform acts to cause each ear to strike, butted end first and to rebound so that the ear strikes the tumblers tip first. In striking tip first, the ear is thus best presented to the action of the rolls for husking, including the removal of its silk.

Operation

In operation, the debutting machine, constructed as herein described, may be fed by placing the green corn C as it is received from the grower directly upon the feed-in chain 53, which act is facilitated by the diverging hopper-like side walls 52 of the assembly 51. It is only necessary that the ears be placed with the tip pointed toward the head frame 6. Any over-lapping of the ears, should this occur, will not result in jamming of the ears at the head mechanism because of the increased speed of the feed-in rollers 56 and 57 over the speed of travel of the chain 53. The side rails 66 function during the feed-in operation to laterally align each ear properly upon its axis of travel up to the point where it is engaged by the aligner roll and presser wheel assemblies.

In the event that the ears is of minimum diameter, the yieldingly mounted feed-in rollers 56 and 57 will remain in their normal position, but where the ear is of larger diameter the rollers 56 and 57 will yield slightly in a downward direction after initial engagement thereof by the presser wheel and aligner roll assemblies so that, without regard to ear diameter, there may always be full engagement between the rollers and the bottom side of the ear and hence proper conduct of the ear through the aligning mechanism, in the manner hereinafter described.

Once the ear has been engaged by the cooperating presser wheels 78 and aligner rolls 71, the presser wheels 78 will be elevated by virtually "riding up" upon the ear an amount determinable by the diameter of the ear at that portion of its length immediately in registry therewith. Movement of the presser wheels 78 upwardly through their pivotal mountings 83, will, through the linkage 98, 95, 90, 91, 74, cause the shafts 72 with their aligner rolls 71 to be drawn upwardly and outwardly, thus causing corresponding movement of the ear supporting surfaces 76 of the aligner rolls upon which the under side portions of the ear rest. The result of such operation of the parts is to cause the under side of the ear to lie in a certain and predetermined fixed horizontal position, without regard to the diameter of the ear and further without regard to slight irregularities in girth contour, one side relative to the other. This latter advantage is gained because of the fact that each presser wheel acts independently of the other, and each therefore controls its own aligner roll 71.

A further and important advantage attributable to the independently mounted presser wheels 78 is that, with an increase in diameter of the corn treated, the points of contact between presser wheels and aligner rolls, severally, spread further apart from one another thus more evenly to distribute engagement between the contacting parts of the mechanism and the side portions of the ear. This procedure results in the accurate maintenance of the ear in its prescribed course of travel with its under side in the aforementioned fixed course of travel.

The importance of carrying the ear through a certain and fixed course of travel will be readily apparent after consideration of the carrier mechanism which transfers the ears from their final aligned position directly to the cutting knives, the operation of which is described in detail in a following portion of this specification.

As the ears are moved between the driven presser wheels 78 and aligner rolls 71, the forward portion of the ear next engages the surfaces 107 and 112 of the presser plates 105 and retarding plates 108, the retarding plates yielding downwardly and acting under the influence of the springs 110 in such manner that endwise movement of the ear is resisted and the shoulder of the ear thus caused to travel about a portion of the aligner rolls. The weight of the presser assembly, including the presser wheels and plates, serve at this time to keep the shoulder of the ear in firm contact with the aligner rolls 71 so that husk, about the grain shoulder of the ear, is slightly crushed to enable the ear portion at the grain shoulder to travel close to the contacting portion of the aligner rolls thus automatically "locating" the grain shoulder for the final aligned position of the ear.

As the ear, with its portion at the grain shoulder bearing upon the adjusted aligner rolls 71, travels about the portion of the aligner rolls as stated, it will gradually move downwardly lowering the presser assembly, although at this time the aligner rolls 71 will not move inwardly because of the lost motion connection, in the linkage between the presser assembly and aligner assembly including the slotted arm 98, until the ear is in its final aligned position with the grain shoulder in vertical registry with the cutting knives 118 and 119.

When the ear arives at its said finally aligned position, it is engaged by the teeth 126 and 127 of the carrier wheels in such manner that the ear is carried vertically downwardly, its butt being forced through the cutting knives and severed from the grain bearing portion of the ear, and in each event, exactly at the grain shoulder. During such travel of the ear, the springs 131 will yield to permit the pairs of carrier wheels to move apart an amount determinable by the size of the ear, so that firm engagement between the carrier wheels and the ear at spaced points intermediate the length of the ear is maintained.

It will be noted, see Fig. 6, that the teeth 126 and 127 on the carrier wheels 124 and 125 respectively are spaced apart from one another about the peripheries of the carrier wheels and that they are likewise spaced from the edges of the wheel peripheries. Such an arrangement provides relatively sizable areas or "lands" adjacent the inner ends of the teeth which serve to limit the depth of bite of the teeth into the husk portion of the ears during the ear carrying operation, thus to preclude injury to the grains by piercing, as might readily occur in the event such "lands" were not provided.

The ear, during its passage from its finally aligned position through the cutting knives, will cause the retarding plates 108 to be moved downwardly, against the action of the springs 110, as such travel progresses. When a small ear of corn is being carried downward, movement of the retarding plates will be aided by contact between the presser plates 105 and the bosses 114 of the retarding plate assemblies.

In the event that the butt of the ear has a stalk portion of sizeable dimension, the adjacent feed-in rollers 57, or both sets of rollers 56 and 57, may be urged downwardly by engagement of the stalk therewith to permit its passage as the ear is carried downwardly by the carrier wheels. With reference to Fig. 4 it will also be noted that the angular relationship of the axes of the aligner rolls 71 is such that once the stalk portion of the butt has passed between the upper portions of the aligner rolls the stalk is immediately relieved from any possible retarding contact with the end surfaces of the rolls, a condition which would not exist should the aligner rolls be located on a common axis as heretofore proposed.

During the aligning of the ear, and while it is moving in contact with and relative to the presser plates 105, the slitting knife 137, see Fig. 9, will function to slit a portion of the husk longitudinally of the ear, but only for a depth definitely determined, without regard to ear diameter, by the extent to which the knife protrudes downwardly beyond the surface 107 of the presser plate upon which it is mounted. The husk of the ear being slit as described is therefore prepared for more efficient treatment by the ruffler elements 138 of which those on the carrier support flange 134 are longer than those of the flange 135.

The ruffler elements 138, which remain relatively stationary as the ear is carried downwardly by the carrier wheels, act to bite into the husk thus to tear the husk away from the grain rows and in general to render the husk susceptible to ready removal by the husking tumblers 5. Disengagement of the husk from possible entanglement upon the relatively sharp carrier wheel teeth 126 and 127 is facilitated by the contour of the carrier assembly housing flanges 134 and 135, as best illustrated in Fig. 6, so that the ear may be dropped, while in a horizontal position, as last carried by the wheels 124 and 125, directly upon the inclined surface 141 where the butt end striking first will cause the ear to move with its tip first engaging with the tumbler rolls 5. This latter movement of the ears is clearly indicated in dotted lines in Fig. 1.

It will be apparent from the foregoing that a machine constructed in accordance with my invention, subjects each ear of corn treated therein to identical, efficient slitting, debutting, ruffling and husking procedure, no matter what its length or diameter may be, nor however it may vary as to girth contour.

It will also be apparent that the machine by virtue of its construction and the arrangement of its parts is unusually compact. The housings enclosing all of the driving gear trains and the assemblies upon the primary shafts 17 are all so designed as to facilitate lubrication by simple operation and in conventional manner. Ball bearings have been indicated as providing efficient anti-friction mountings for moving parts, although of course such bearings may be replaced, in manufacture, for any other desirable bearing means as particular requirements may dictate. This feature is in part attributable to the compact assemblies upon the primary shafts 17 and to the use of rotating carrier wheels in place of the more cumbersome carrier chains of previous machines, the use of which is made possible largely because of my improved aligning means as herein described.

It will be understood that while I have illustrated but one particular embodiment of my invention, in the form of a complete husking machine, that such embodiment may be varied greatly, as to design, without departing from within the spirit and scope of my invention as set forth in the appended claims.

I claim:

1. In a corn husking machine, means for feeding corn ears tip first in the direction of the length thereof, means for thereafter feeding said corn ears sidewise, means for slitting the ear husks longitudinally while they are moving in the direction of their length, means for debutting the corn ears while they are being fed sidewise, and means for stripping the longitudinally slit husks from the debutted corn ears.

2. In a corn husking machine, means for longitudinally slitting the corn ear husks, means for debutting the corn ears, means for stripping the longitudinally slit husks from the debutted corn ears, means for imparting movement to the corn ears for successively presenting them first to said slitting means, next to said debutting means and then to said stripping means, said stripping means including rotating husking rolls between which the husks are gripped and thereby stripped from the ears, and means for causing the ears to first engage said rolls with the tips thereof angled downwardly.

3. In a corn husking machine, means for feeding corn ears in the direction of the length thereof, means for feeding said corn ears sidewise, means for slitting the ear husks longitudinally while they are moving in the direction of their length, means for debutting the corn ears while they are being fed sidewise, means for ruffling the longitudinally slit husks while the ears are being debutted, and means for stripping the longitudinally slit husks from the debutted corn ears.

4. In a corn husking machine, means for longitudinally slitting the corn ear husks, means for thereafter debutting the corn ears, ruffling means engageable with the slit husks for loosening them from the corn ears, means for stripping the longitudinally slit husks from the debutted corn ears, and means for imparting movement to the corn ears for presenting them to said slitting means, said debutting means and said stripping means.

5. In a corn husking machine, means for longitudinally slitting the corn ear husks, means for thereafter debutting the corn ears, ruffling means engageable with the slit husks for loosening them from the corn ears, means for stripping the longitudinally slit husks from the debutted corn ears, means for feeding the corn ears in the direction of their length to present them to said slitting means, and means for feeding the corn ears sidewise for presenting them to said debutting means, said ruffling means and said stripping means.

6. In a corn husking machine, spaced rotating corn ear aligning devices, corn ear debutting cutter devices disposed in cooperative debutting relation with said aligning devices, means for feeding corn ears one after another in endwise direction toward said cutter devices, a slitter disposed in the path of travel of said ears for slitting the husks in a lengthwise direction as each ear passes along through the aligning devices, means for feeding the aligned ears sidewise to the cutter devices to be debutted thereby, means for stripping the longitudinally slit husks from the debutted corn ears, and ruffling means effective to loosen the husks from the corn ears after they have been slit and prior to the stripping thereof from the ears.

7. In a corn husking machine, cutting means for debutting corn ears, aligning means for positioning the ears relative to the cutting means, a yieldably mounted presser mechanism cooperating with the aligning means, slitting means mounted on the presser mechanism for slitting the corn ear husks longitudinally of the ears as they pass over the aligning means, means for stripping the longitudinally slit husks from the debutted corn ears, means for imparting endwise movement to the corn ears tip first on to the aligning means, and means for thereafter moving said ears sidewise to said cutting means and to said stripping means.

8. In a corn husking machine, cutting means for debutting corn ears, aligning means for positioning the ears relative to the cutting means, a yieldably mounted presser mechanism cooperating with the aligning means, slitting means mounted on the presser mechanism for slitting the corn ear husks longitudinally of the ears as they pass over the aligning means, means for stripping the longitudinally slit husks from the debutted corn ears, means for imparting endwise movement to the corn ears tip first on to the aligning means, means for thereafter moving said ears sidewise to said cutting means and to said stripping means, and corn ear husk ruffling means effective to engage the ears while they are moving sidewise and loosen the husks from said ears prior to engagement with said stripping means.

9. In a corn husking machine, means for longitudinally slitting the corn ear husks, means for debutting the corn ears, means for stripping the longitudinally slit husks from the debutted corn ears, and means for imparting movement to the corn ears for successively presenting them to said slitting means, said debutting means and said stripping means, said feeding means including opposed positively driven rotary elements between which the corn ears pass and movable toward and from each other for following variations in corn ear contours, said slitting means being movable with certain of said rotary elements for following said varying corn ear contours and for controlling the depth of penetration through the corn ear husks.

10. In a corn husking machine, cutting means for debutting corn ears, an aligning roll against which corn ears engage and disposed for aligning corn ear butts with said cutting means, a presser wheel opposed to said roll and effective to press corn ears thereagainst, means mounting said roll and wheel for relative movement in compensation for variations in corn ear contours, a presser plate engageable with travelling corn ears moving into butt aligning relation with said roll and movable for corn ear contour variation compensating purposes with said wheel, a slitting blade mounted on said plate and effective to longitudinally slit the corn ear husks as the corn ear butts are being moved into alignment with said cutting means, means for stripping the longitudinally slit husks from the debutted corn ears, means for imparting endwise movement to the corn ears tip first into butt aligning position, and means for moving said ears sidewise to said cutting means and to said stripping means.

11. In a corn husking machine, cutting means for debutting corn ears, an aligning roll against which corn ears engage and disposed for aligning corn ear butts with said cutting means, a presser wheel opposed to said roll and effective to press corn ears thereagainst, means mounting said roll and wheel for relative movement in compensation for variations in corn ear contours, a presser plate engageable with travelling corn ears moving into butt aligning relation with said roll and movable for corn ear contour variation compensating purposes with said wheel, a slitting blade mounted on said plate and effective to longitudinally slit the corn ear husks as the corn ear butts are being moved into alignment with said cutting means, means for stripping the longitudinally slit husks from the debutted corn ears, means for imparting endwise movement to the corn ears tip first into butt aligning position, means for moving said ears sidewise through said cutting means and to said stripping means, and means effective as the corn ears are moving through said cutting means to ruffle the previously slit husks and loosen them from the corn ears.

12. In a machine of the character described wherein is provided a corn ear debutting station, means for longitudinally slitting husks on the corn ears, debutting means at said station, means for moving corn ears sidewise past said station for debutting the same, and means at said station for ruffling the slit husks on the ears as they are being debutted.

13. In a machine of the character described wherein is provided a corn ear debutting station, means for longitudinally slitting husks on the corn ears, rotary cutter means at said station, means for moving corn ears sidewise past and in contact with said cutting means for debutting the same, and means stationarily mounted at said station for ruffling the slit husks on the ears as they are being debutted.

14. In a machine of the character described, means for longitudinally slitting the husks on corn ears, means for ruffling the slit husks, means for stripping the husks from the ears, said last named means including rotating husking rolls between which the husks are gripped and thereby stripped from the ears, and means for causing the ears to first engage said rolls with the tips thereof angled with respect to the roll axes.

15. In a corn husking machine, means for feeding corn ears in the direction of the length thereof, means for thereafter feeding said corn ears sidewise, means for debutting the corn ears while they are being fed sidewise, means engageable with the grain shoulder of the corn ears for aligning them with the debutting means, means for longitudinally slitting the husks on the corn ears as they are being aligned with the debutting means, and means for stripping the longitudinally slit husks from the debutted corn ears immediately after the debutting thereof.

16. In a corn husking machine, means for feeding corn ears in the direction of the length thereof, means for thereafter feeding said corn ears sidewise, means for debutting the corn ears while they are being fed sidewise, means engageable with the grain shoulder of the corn ears for aligning them with the debutting means, means for longitudinally slitting the husks on the corn ears as they are being aligned with the debutting means, means yieldably engaging with and about the corn ears for holding them in complete control during the slitting and aligning thereof, and means for stripping the longitudinally slit husks from the debutted corn ears immediately after the debutting thereof.

17. In a corn husking machine, means for longitudinally slitting the corn ear husks, means for debutting the corn ears, means for stripping the longitudinally slit husks from the debutted corn ears, means for feeding the corn ears tip first in the direction of the length thereof to present them to said slitting means, means for feeding the corn ears sidewise for presenting them to said debutting means and said stripping means, and means yieldably engaging with and about the corn ears for holding them in complete control while being slit and fed to the debutting means.

18. In a corn husking machine, means for longitudinally slitting the corn ear husks, means for debutting the corn ears, means for stripping the longitudinally slit husks from the debutted corn ears, means for feeding the corn ears tip first in the direction of the length thereof to present them to said slitting means, means for feeding the corn ears sidewise for presenting them to said debutting means and said stripping means, and means yieldably engaging with and about the corn ears for holding them in complete control while being slit and fed to the debutting means, said last named means including upper and lower corn ear engaging plates, and said slitting means comprising blade means carried by certain of said plates.

RALPH COVER.